(12) United States Patent
Deferme

(10) Patent No.: US 11,454,292 B2
(45) Date of Patent: Sep. 27, 2022

(54) DAMPER ASSEMBLY

(71) Applicant: DRiV Automotive Inc., Lake Forest, IL (US)

(72) Inventor: Stefan Deferme, Heusden-Zolder (BE)

(73) Assignee: DRiV Automotive Inc., Skokie, IL (US)

(*) Notice: Subject to any disclaimer, the term of this patent is extended or adjusted under 35 U.S.C. 154(b) by 88 days.

(21) Appl. No.: 16/993,889

(22) Filed: Aug. 14, 2020

(65) Prior Publication Data
US 2022/0049753 A1    Feb. 17, 2022

(51) Int. Cl.
| | |
|---|---|
| F16F 9/46 | (2006.01) |
| F16F 9/06 | (2006.01) |
| F16F 9/36 | (2006.01) |
| F16F 9/34 | (2006.01) |
| F16F 9/32 | (2006.01) |
| F16F 9/512 | (2006.01) |

(52) U.S. Cl.
CPC ............ *F16F 9/065* (2013.01); *F16F 9/3271* (2013.01); *F16F 9/34* (2013.01); *F16F 9/369* (2013.01); *F16F 9/512* (2013.01); *B60G 2202/24* (2013.01); *B60G 2206/41* (2013.01); *B60G 2206/8201* (2013.01); *B60G 2500/10* (2013.01); *B60G 2800/162* (2013.01); *F16F 9/062* (2013.01); *F16F 2222/12* (2013.01); *F16F 2226/048* (2013.01); *F16F 2228/066* (2013.01)

(58) Field of Classification Search
CPC ...... F16F 9/18; F16F 9/32; F16F 9/185; F16F 9/325

USPC .......... 188/314, 318, 322.13, 322.2
See application file for complete search history.

(56) References Cited

U.S. PATENT DOCUMENTS

| | | | | |
|---|---|---|---|---|
| 5,375,683 | A * | 12/1994 | Huang | F16F 9/096 |
| | | | | 188/266.6 |
| 8,469,162 | B2 | 6/2013 | Nishimura et al. | |
| 10,514,077 | B2 * | 12/2019 | Zeissner | F16F 9/325 |
| 2013/0081913 | A1 * | 4/2013 | Nowaczyk | B23K 11/14 |
| | | | | 188/315 |
| 2019/0136932 | A1 * | 5/2019 | Deferme | F16F 9/185 |
| 2021/0018057 | A1 * | 1/2021 | Tucker | B60G 11/265 |

FOREIGN PATENT DOCUMENTS

| | | |
|---|---|---|
| DE | 19527851 C2 | 10/1998 |
| DE | 102005023235 B3 | 9/2006 |
| DE | 10355151 B4 | 4/2009 |
| DE | 102008062162 B3 | 6/2010 |
| EP | 0635655 B1 | 5/1996 |

(Continued)

*Primary Examiner* — Christopher P Schwartz
(74) *Attorney, Agent, or Firm* — DRiV Automotive Inc.

(57) ABSTRACT

A damper assembly includes a damper, an accumulator, and a tube mount. The damper includes a tube having an outer surface. The tube defines a central axis and a first cavity in the outer surface. The accumulator has an end defining a second cavity. The accumulator defines a longitudinal axis. The tube mount is attached to the outer surface of the tube around the first cavity. The tube includes a damper fluid. The end of the accumulator is supported by the tube mount to allow the damper fluid to flow from the tube through the first cavity and into the accumulator through the second cavity. The longitudinal axis of the accumulator is transverse to the central axis of the tube.

18 Claims, 6 Drawing Sheets

(56) References Cited

FOREIGN PATENT DOCUMENTS

| EP | 0905408 A2 * | 3/1999 | .............. F16F 9/369 |
|---|---|---|---|
| EP | 1508723 A2 | 2/2005 | |
| GB | 2262971 * | 7/1993 | .............. F16F 9/062 |
| WO | 2016150776 A1 | 9/2016 | |
| WO | 2016151015 A1 | 9/2016 | |
| WO | WO-2016150776 A1 * | 9/2016 | ............ F16F 9/3257 |

* cited by examiner

DAMPER ASSEMBLY

BACKGROUND

Dampers are typically used in conjunction with automotive suspension systems or other suspension systems to control movement of wheels of a vehicle relative to a body of the vehicle. In order to control movement, dampers are generally connected between the sprung (body) and the unsprung (suspension/drivetrain) masses of the vehicle.

Typical dampers control movement of the wheels by limiting fluid flow past a piston of the damper. The fluid flows past the piston, e.g., via passages of the piston, when the damper is moved toward a compressed or extended position. The passages may have a fixed opening size. Resistance to movement is provided by the passages limiting an amount of fluid that flows therethrough. The resistance to movement may increase exponentially as movement speed is increased.

DETAILED DESCRIPTION

Figure 1:
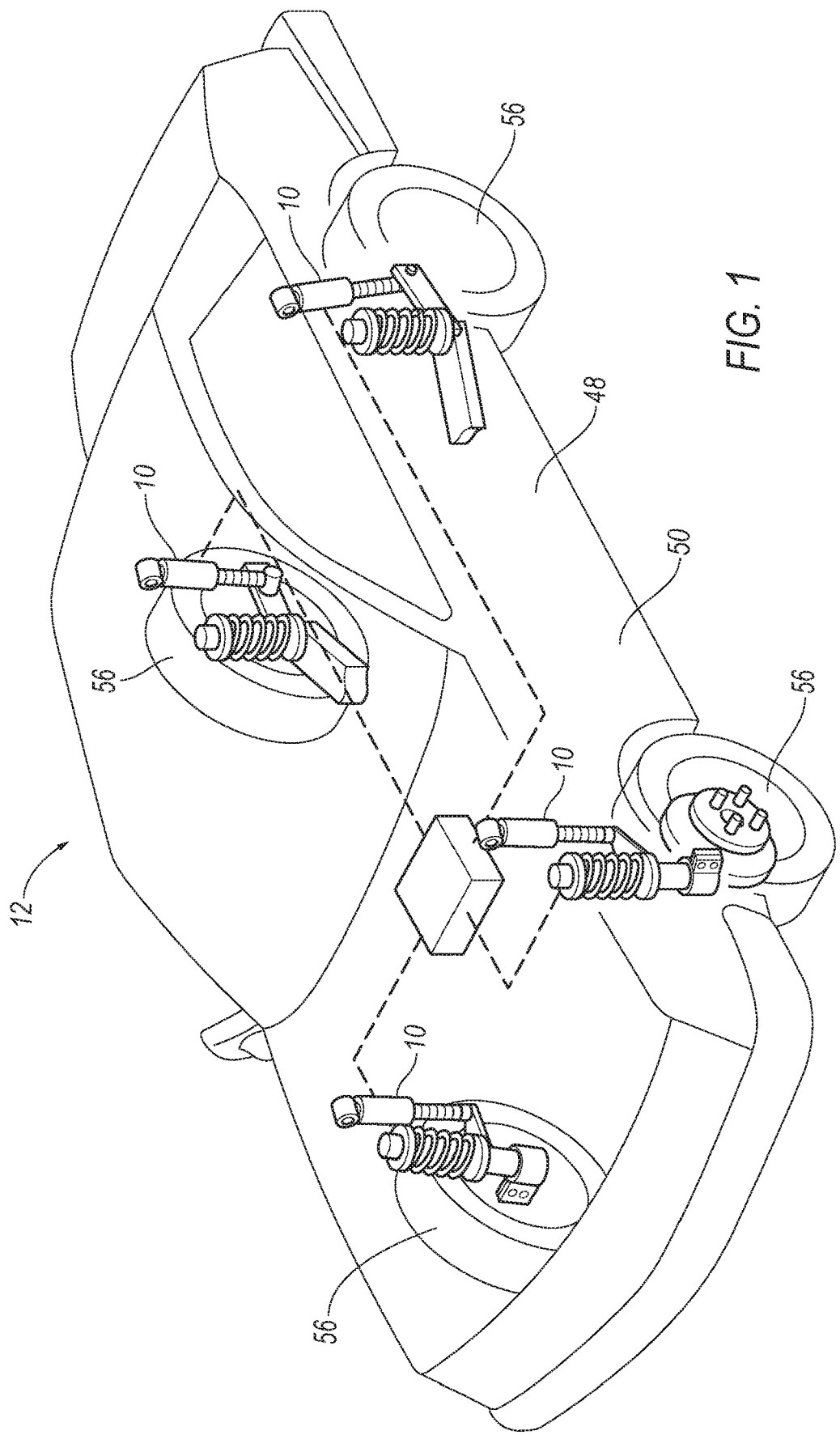
FIG. 1 is a perspective view of a vehicle.

Damper assemblies can include an accumulator to allow volumetric changes in a damper tube filled with damper fluid, e.g., incompressible oil. As a rod and piston of the damper move in an inner tube of the damper, the volume of the damper fluid in the inner tube changes. The volume change causes the damper fluid to move between the inner tube and an outer tube of the damper. To accommodate the volume changes of the oil in the inner and outer tubes caused, excess damper fluid can be accumulated in another part of the damper. The accumulator allows the excess damper fluid to accumulate as the rod moves through the inner tube, providing space for excess damper fluid during a compression stroke and returning the damper fluid to the tube during a rebound stroke. As the rod and the piston move through the damper fluid, viscous friction between the damper fluid and the piston converts energy from vibrations from vehicle wheels to thermal energy, absorbing some of the energy from the vibrations. These absorbed vibrations reduce vibrations transmitted to vehicle occupants, improving ride stability for the occupants.

The accumulator can be externally attached to the damper. Space constraints in a vehicle can restrict where the accumulator may be attached to the damper. For example, the accumulator may not be able to be attached perpendicular to an outer surface of a tube of the damper without interfering with another vehicle component. Such space constraints can limit the installation options of the accumulator.

Installing the accumulator transverse to the tube provides additional installation options to accommodate the space constraints. For example, rotating the accumulator eighteen degrees away from an axis normal to the outer surface of the tube can allow the accumulator to fit next to another vehicle component. Rotating the accumulator around other vehicle components eases installation of the damper assembly into the vehicle. Welding the accumulator to the tube of the damper secures the accumulator to the tube in the rotated orientation and in a common manner as other vehicle components, further easing installation of the damper assembly.

A tube mount that allows for rotation of the accumulator eases installation of the accumulator to the tube and creates a fluid-tight seal to prevent leakage of the damper fluid from the tube or the accumulator. The tube mount can be designed to maintain the fluid-tight seal when the accumulator is in different orientations, allowing installation of the accumulator in vehicles with differing space constraints.

A damper assembly 10 in a vehicle 12 includes a damper 14. The damper 14 includes a tube 16, an accumulator 22, and a tube mount 28. The tube has an outer surface 18. The tube 16 defines a central axis A and a first cavity 20 in the outer surface 18. The accumulator 22 has an end 24 defining a second cavity 26. The accumulator 20 defines a longitudinal axis B. The tube mount 28 is attached to the outer surface 18 of the tube 16 around the first cavity 20. The tube 16 includes a damper fluid 30. The end 24 of the accumulator 22 is supported by the tube mount 28 to allow the damper fluid 30 to flow from the tube 16 through the first cavity 20 and into the accumulator 22 through the second cavity 26. The longitudinal axis B of the accumulator 22 is transverse to the central axis A of the tube 16.

Because the accumulator 22 can rotate to a specified orientation, the accumulator 22 can be installed onto the damper 14 to accommodate space restrictions in the vehicle 12. That is, when the longitudinal axis B of the accumulator 22 is transverse to the central axis A of the tube 16, the accumulator 22 allows the volume of damper fluid 30 in the tube 16 to change while fitting into the specific space requirements of the vehicle 12.

The vehicle 12, illustrated in FIG. 1, may be any type of passenger or commercial vehicle such as a car, a truck, a sport utility vehicle, a crossover vehicle, a van, a minivan, a taxi, a bus, etc. The vehicle 12 includes a body 48 and a frame 50. The body 48 and frame 50 may be of a unibody construction. In the unibody construction, the body 48, e.g., rockers, serves as the vehicle frame, and the body 48 (including the rockers, pillars, roof rails, etc.) is unitary, i.e., a continuous one-piece unit. As another example, the body 48 and frame 50 may have a body-on-frame construction (also referred to as a cab-on-frame construction). In other words, the body 48 and frame 50 are separate components, i.e., are modular, and the body is supported on and affixed to the frame. Alternatively, the body 48 and frame 50 may have any suitable construction. The body 48 and/or the frame 50 may be formed of any suitable material, for example, steel, aluminum, etc.

The vehicle 12 includes the damper assembly 10, as shown in FIGS. 1-5. The damper assembly 10 controls motion of wheels 56 of the vehicle 12 relative to the body 48 of the vehicle 12. The damper assembly 10 provides variable force to resist motion of the wheels 56 relative to the body 48 based on a speed and direction of such motion. That is, the damper assembly 10 reduces vibrations transmitted from the wheels 56 to vehicle occupants.

Figure 2:
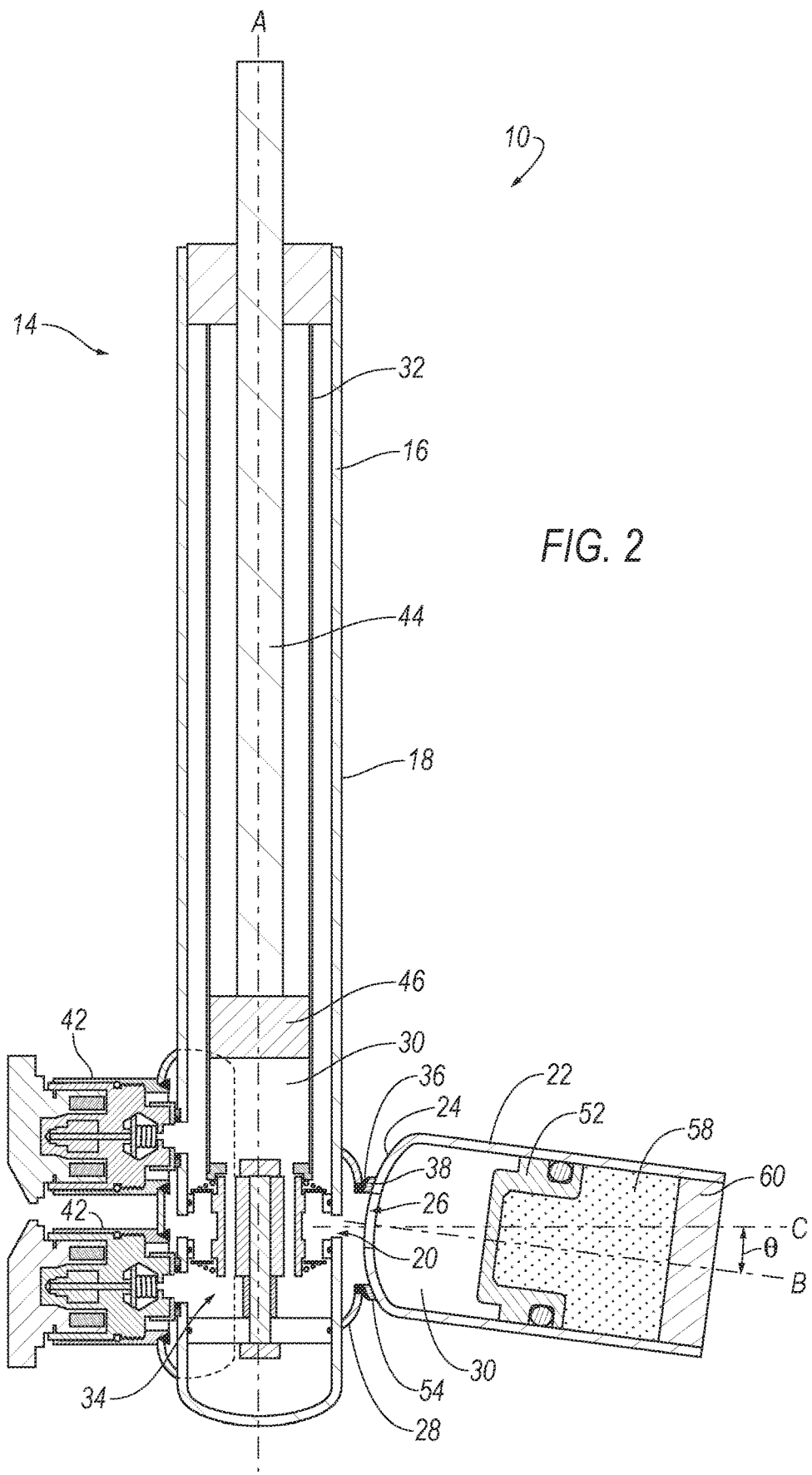
FIG. 2 is a cross-sectional view of a damper assembly.
Figure 3:
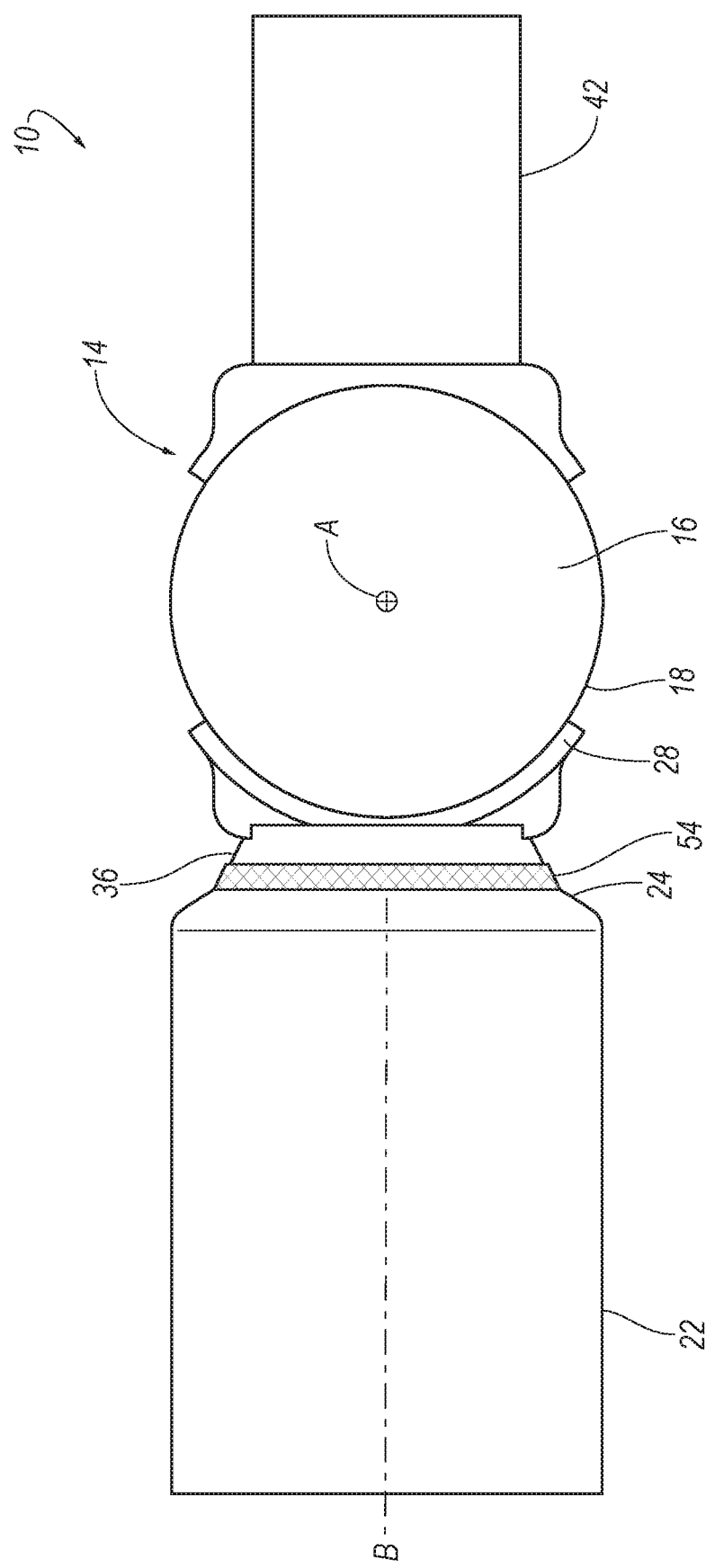
FIG. 3 is a top-down view of the damper assembly.
Figure 4:
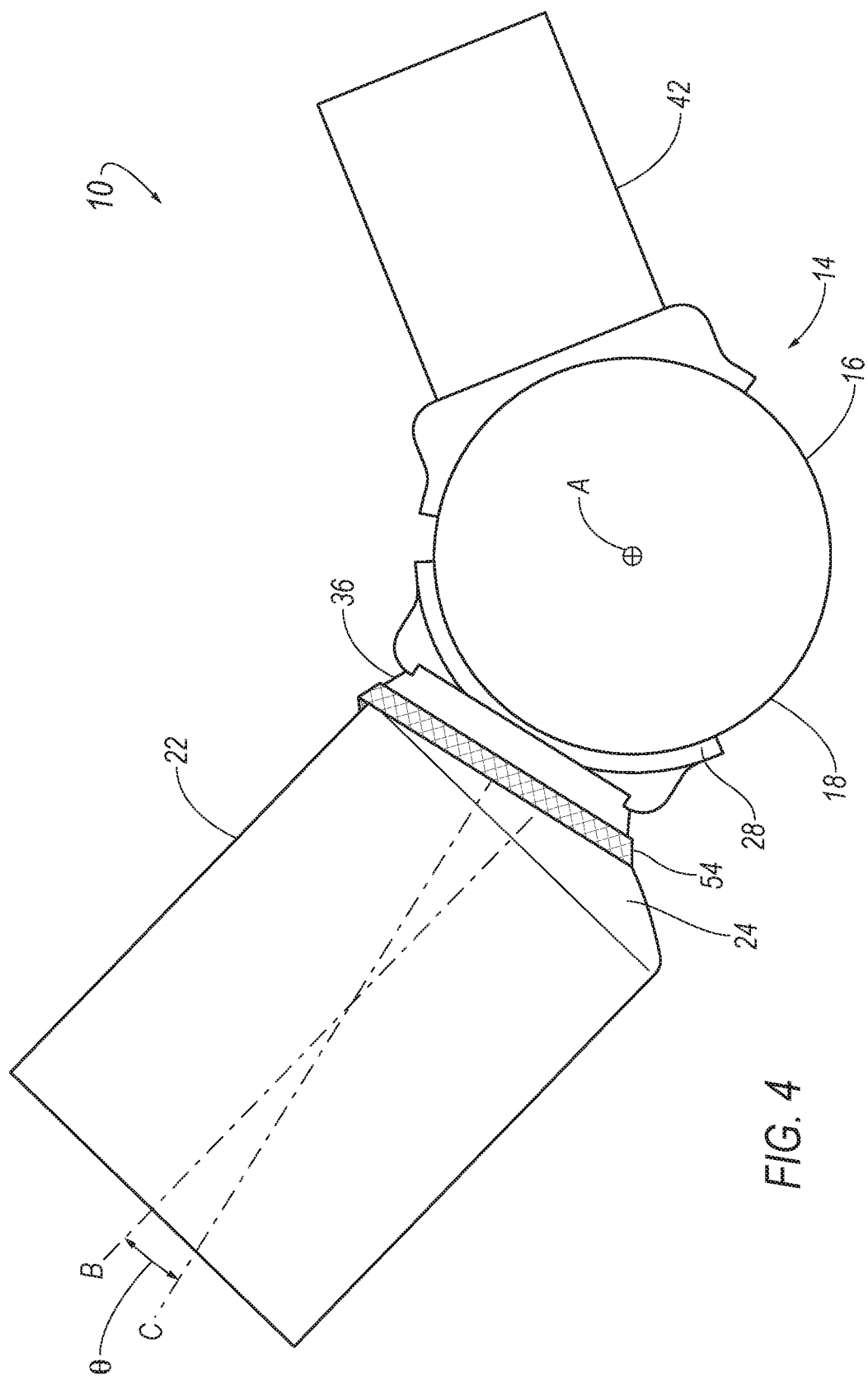
FIG. 4 is a top-down view of the damper assembly.

As shown in FIGS. 2-5, the damper assembly 10 includes the damper 14. The damper 14 includes the tube 16. The tube 16 defines the outer surface 18. The tube 16 defines a central axis. That is, the tube 16 is substantially cylindrical, and the central axis extends vertically through the tube 16. In FIG. 2 the damper 14 is shown as a twin tube assembly including the tube 16 and a second tube 32. The tube 16 is an outer tube, and the second tube 32 is an inner tube disposed in the tube 16. That is, the tube 16 is an outer tube and the second tube 32 is an inner tube. The second tube 32 can include an intake device 34. The intake device 34 directs the damper fluid 30 between the tube 16, the second tube 32, and the accumulator 22. Alternatively, the damper 14 can be a monotube assembly including only the tube 16.

As shown in FIG. 2, the damper 14 can include a rod 44 and a damper piston 46. The rod 44 and the damper piston 46 are movable within the tube 16. The rod 44 moves the damper piston 46 through the second tube 32, increasing pressure in the damper fluid 30. As the pressure of the the damper fluid 30 increases, the damper fluid 30 moves through the intake device 34. The damper piston 46 may be fixed to the rod 44, e.g., by a fastener, weld, friction fit, etc. The rod 44 may be elongated along the central axis A. The damper fluid 30 can be, e.g., an oil with a viscosity designed to absorb vibrations from the wheels 56.

Figure 5:
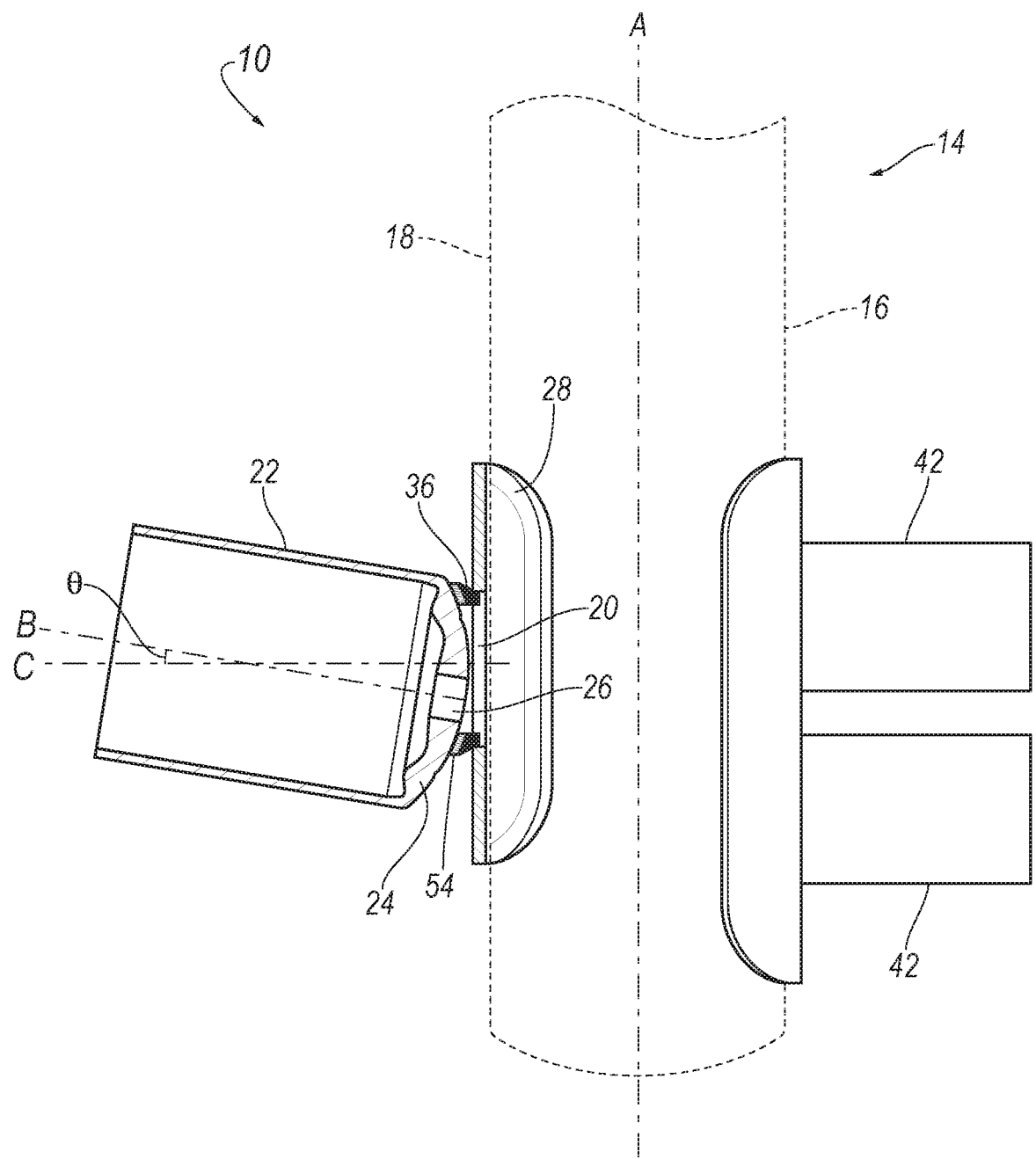
FIG. 5 is side view of the damper assembly.

The tube 16 may include one or more valves 42. In FIGS. 2 and 5, two valves 42 are shown. Alternatively, the tube 16 may include a different number of valves. The valves 42 may be supported by the outer surface 18 of the tube 16. The damper fluid 30 is movable from the tube 16 through the valves 42. The valves 42 can be actuated by a controller (not shown) to allow the damper fluid 30 to exit from the tube 16 through the valves 42 or enter into the tube 16 through the valves 42. The valves 42 may be fixed to the outer surface 18 of the tube 16, e.g., with a weld such as the weld 54 that connects the accumulator 22 to the tube mount 28.

One of the valves 42 can be a compression valve, and the other of the valves 42 can be a rebound valve. The compression valve controls flow of the damper fluid 30 during a compression stroke when the rod 44 moves toward the intake device 34. The rebound valve controls flow of the damper fluid 30 during a rebound stroke when the rod 44 moves away from the intake device 34.

Figure 6:
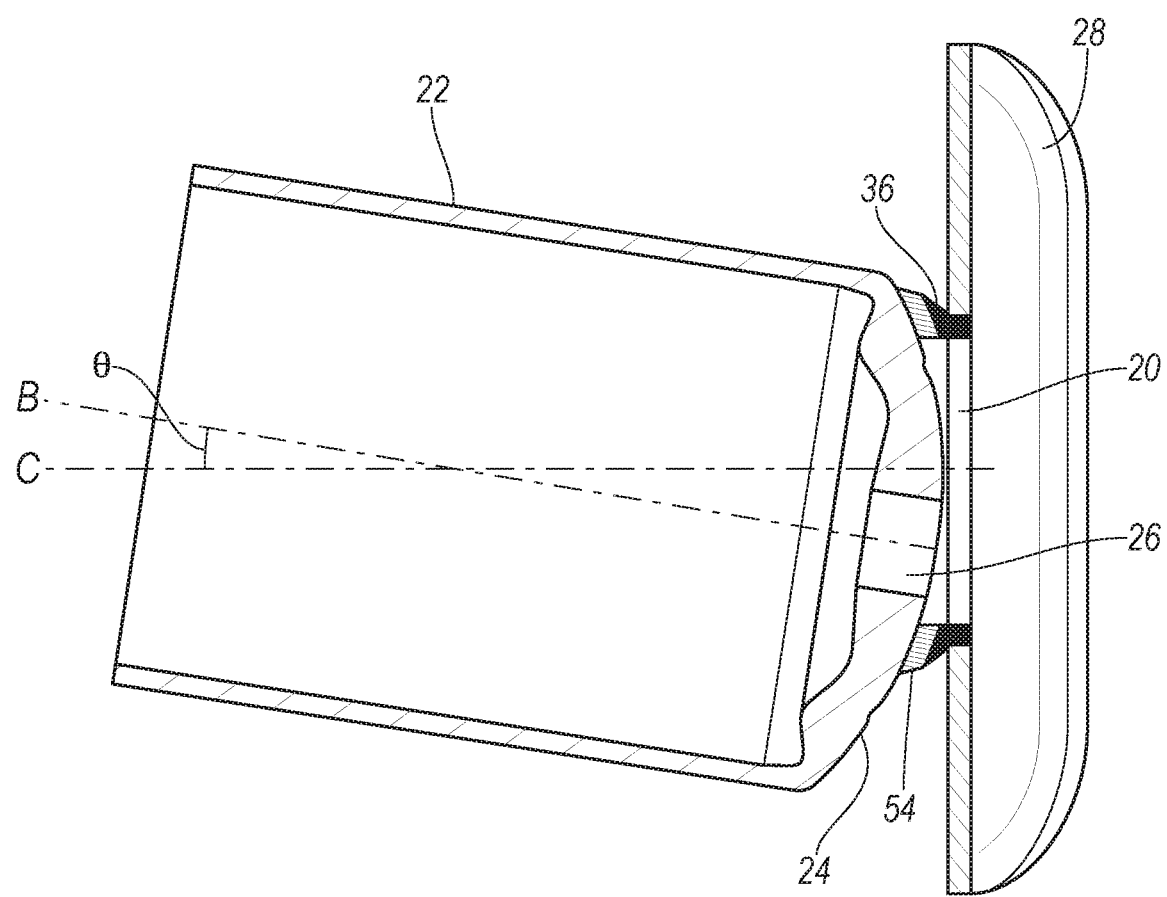
FIG. 6 is a side view of an accumulator and a tube mount.

As shown in FIGS. 2 and 5-6, the tube 16 defines a first cavity 20 in the outer surface 18. The first cavity 20 allows the damper fluid 30 to flow into and out from the accumulator 22. The first cavity 20 may be sized to be enclosed by the end 24 of the accumulator 22. That is, the first cavity 20 can be designed such that damper fluid 30 would not leak from the accumulator 22 when attached to the tube mount 28. The tube 16 defines an axis C normal to the outer surface 18 through the first cavity 20. That is, the first cavity 20 defines the axis C in a direction perpendicular to the central axis A out from the outer surface 18.

As shown in FIGS. 2-6, the damper assembly 10 includes the accumulator 22. The accumulator 22 receives damper fluid 30 from the tube 16 to allow volumetric changes in the second tube 32 caused by the rod 44 and the damper piston 46 moving in the second tube 32. The accumulator 22 allows excess damper fluid 30 to accumulate as the rod 44 moves through the second tube 32, providing space for excess damper fluid 30 during a compression stroke and returning the damper fluid 30 to the second tube 32 during a rebound stroke.

The accumulator 22 includes the end 24, the damper fluid 30, an accumulator piston 52, a fluid 58, and a second end 60. The end 24 defines the second cavity 26. The damper fluid 30 is disposed between the end 24 and the accumulator piston 52. The fluid 58 is disposed between the accumulator piston 52 and the second end 60. The end 24 of the accumulator 22 is supported by the tube mount 28. The fluid 58 is a compressible gas, e.g., nitrogen, air, etc. The pressure of the fluid 58 pushes against the accumulator piston 52.

When the damper assembly 10 receives a vibration from the wheels 56, the damper piston 46 moves within the second tube 32, increasing pressure of the damper fluid 30. During a compression stroke, the rod 44 and the damper piston 46 move toward the intake device 34, increasing the pressure in the damper fluid 30. The valves 42, e.g., the compression valve, direct the damper fluid 30 into the tube 16 and to the accumulator 22. The damper fluid 30 is movable through the second cavity 26 to move the accumulator piston 52 toward the second end 60. As the damper fluid 30 enters the accumulator 22, the accumulator piston 52 moves toward the second end 60, increasing pressure the fluid 58. The damper fluid 30 moves the accumulator piston 52 and compresses the fluid 58 until the pressure of the fluid 58 equals the pressure of the damper fluid 30.

During a rebound stroke, the rod 44 and the damper piston 46 move away from the intake device 34. The valves 42, e.g., the rebound valve, direct the damper fluid 30 from the accumulator 22 into the second tube 32. As pressure of the damper fluid 30 decreases, the pressurized fluid 58 pushes against the accumulator piston 52, pushing the damper fluid 30 out of the accumulator 22. The damper fluid 30 is movable from the tube 16 into the accumulator 22 along the longitudinal axis B. Thus, the accumulator 22 receives the damper fluid 30 during the compression stroke and releases the damper fluid 30 during the rebound stroke.

As shown in FIGS. 2-6, The accumulator 22 defines the longitudinal axis B. The longitudinal axis B of the accumulator 22 is transverse to the central axis A of the tube 16. The accumulator 22 is movable within the tube mount 28 to a specified orientation such that the accumulator 22 is transverse to the tube 16. The specified orientation can be determined to accommodate space constraints in the vehicle 12. For example, the accumulator 22 can be rotated to avoid contact with another vehicle component. Because the accumulator 22 maintains fluid connection with the tube 16 in the specified orientation, the accumulator 22 can be moved to accommodate space constraints when installing the damper assembly 10 in the vehicle 12. The accumulator 22 is rotatable within the tube mount 28 to the specified orientation. The longitudinal axis B can extend at least partially in a vertically downward direction. That is, the accumulator 22 can be rotated such that the longitudinal axis B extends away from a horizontal plane, pointing at least partially downward.

As shown in FIGS. 2-6, the longitudinal axis B of the accumulator 22 and the axis C normal to the outer surface 18 define an orientation angle θ therebetween. The orientation angle θ is a measure of the longitudinal axis B being transverse to the axis C. The orientation angle θ can be an acute angle, i.e., an angle between zero degrees and ninety degrees. For example, the orientation angle θ can be between ten and twenty degrees, e.g., eighteen degrees. The orientation angle θ can be determined based on space constraints when installing the damper assembly 10 in the vehicle 12, e.g., to avoid contact between the accumulator 22 and another vehicle component. That is, the orientation angle θ illustrates the ability of the accumulator 22 to be moved relative to the outer surface 18 to accommodate restrictions on installation space in the vehicle 12 while providing the advantages to damping vibrations of the accumulator 22. When the orientation angle θ is nonzero, the longitudinal axis B is transverse to the axis C and to the central axis A. By installing the accumulator 22 transverse to the outer surface 18 of the tube 16, damper fluid 30 can flow into and out from the accumulator 22 while fitting the damper assembly 10 around other vehicle components. Thus, the advantages of using the accumulator 22 are achieved while accommodating space constraints in the vehicle.

As shown in FIGS. 2-6, the damper assembly 10 includes the tube mount 28. The tube mount 28 attaches to the outer surface 18 of the tube 16 around the first cavity 20. That is, the tube mount 28 surrounds the first cavity 20, preventing the damper fluid 30 from exiting the first cavity 20 away from the tube mount 28. The tube mount 28 secures the accumulator 22 to the tube 16 in the specified orientation. Thus, the tube mount 28 ensures that the damper fluid 30 travels between the tube 16 and the accumulator 22 without leaking. The tube mount 28 can include a ring 36. The ring 36 is a circular extension that receives the accumulator 22. The accumulator 22 can be supported by the ring 36.

The end 24 of the accumulator 22 can be connected to the ring 36 with a weld 54, as shown in FIGS. 2-6. The tube mount 28 may be steel, and the accumulator 22 may also be steel, allowing the weld 54 to connect the accumulator 22 to the tube mount 28. Welds like the weld 54 may be used to connect other parts of the damper assembly 10, e.g., the rod 44 and the damper piston 46, the damper 14 and the vehicle body 50, etc. When the accumulator 22 is secured to the ring 36 with the weld 54, the accumulator 22 is fixed in the specified orientation.

As shown in FIG. 2, the tube mount 28 and the end 24 of the accumulator 22 form a seal 38. The seal 38 is fluid-tight, i.e., designed to prevent the damper fluid 30 from leaking from the tube 16. The tube mount 28 and the end 24 of the accumulator 22 can form a substantially circular seal 38. That is, because the ring 36 is substantially circular, the contact area between the tube mount 28 and the ring 36 forms a circle. When rotating the accumulator 22 to the specified orientation, the accumulator 22 maintains a circular seal 38 with the tube mount 28.

The outer surface 18 of the tube 16 has a curvature. That is, the tube 16 may be substantially cylindrical, defining a curvature in the outer surface 18. The tube mount 28 can have substantially a same curvature as the outer surface 18 of the tube 16. When the tube mount 28 has substantially a same curvature as the outer surface 18 of the tube 16, damper fluid 30 may be stopped from leaking between the tube mount 28 and the outer surface 18. That is, the connection between the outer surface 18 and the tube mount 28 may have substantially no gaps resulting from differing shapes of the outer surface 18 and the tube mount 28, preventing leaking of the damper fluid 30 from the tube 16.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

The adjectives "first" and "second" are used as identifies and are not intended to indicate significance or order.

The invention claimed is:

1. A damper assembly, comprising:
  a damper including a tube having an outer surface, the tube defining a central axis and a first cavity in the outer surface;
  an accumulator having an end defining a second cavity, the end having a convex outer surface, the accumulator defining a longitudinal axis; and
  a tube mount attached to the outer surface of the tube around the first cavity;
  wherein the tube includes a damper fluid;
  wherein the end of the accumulator is supported by the tube mount to allow the damper fluid to flow from the tube through the first cavity and into the accumulator through the second cavity;
  wherein the longitudinal axis of the accumulator is transverse to the central axis of the tube at a non-right angle;
  wherein the tube mount includes a ring and the accumulator is supported by the ring at the convex outer surface of the end of the accumulator, the ring being in fluid communication with the first cavity and the second cavity allowing damper fluid to flow from the first cavity to the second cavity through the ring.

2. The damper assembly of claim 1, wherein the accumulator is rotatable within the tube mount to a specified orientation.

3. The damper assembly of claim 2, wherein, in the specified orientation, the longitudinal axis of the accumulator defines an angle with an axis normal to the outer surface of the tube, the angle being greater than ten degrees and less than twenty degrees.

4. The damper assembly of claim 1, further comprising a valve supported by the outer surface of the tube.

5. The damper assembly of claim 4, wherein the damper fluid is movable from the tube through the valve.

6. The damper assembly of claim 1, wherein the damper includes a rod movable within the tube.

7. The damper assembly of claim 6, wherein the rod is arranged to move the damper fluid through the tube and into the accumulator.

8. The damper assembly of claim 1, wherein the longitudinal axis of the accumulator defines an angle with an axis normal to the outer surface of the tube, the angle being greater than zero degrees and less than ninety degrees.

9. The damper assembly of claim 8, wherein the angle is greater than ten degrees and less than twenty degrees.

10. The damper assembly of claim 1, wherein:
  the first cavity and the ring are coaxial on an axis perpendicular to the central axis of the tube;
  the second cavity of the accumulator is on the longitudinal axis of the accumulator; and
  the longitudinal axis of the accumulator is transverse to the axis of the first cavity and the ring and the longitudinal axis extends through the ring.

11. The damper assembly of claim 10, wherein the convex outer surface of the end of the accumulator is welded to the ring.

12. The damper assembly of claim 1, wherein the convex outer surface of the end of the accumulator is welded to the ring.

13. The damper assembly of claim 1, wherein the tube mount and the end of the accumulator form a fluid-tight seal.

14. The damper assembly of claim 1, wherein the ring and the convex outer surface of the end of the accumulator form a substantially circular seal.

15. The damper assembly of claim 1, wherein the accumulator includes a piston and the damper fluid is movable into the accumulator to move the piston.

16. The damper assembly of claim 1, wherein the damper fluid is movable from the tube into the accumulator along the longitudinal axis.

17. The damper assembly of claim 1, wherein the longitudinal axis extends in a downward direction.

18. The damper assembly of claim 1, wherein the outer surface of the tube has a curvature and the tube mount has substantially a same curvature as the outer surface of the tube.

* * * * *